United States Patent
Garcia-Crespo et al.

(10) Patent No.: US 8,534,073 B2
(45) Date of Patent: Sep. 17, 2013

(54) SYSTEM AND METHOD FOR HEATING A FUEL USING AN EXHAUST GAS RECIRCULATION SYSTEM

(75) Inventors: Andres J. Garcia-Crespo, Greenville, SC (US); Amit S. Toprani, Greenville, SC (US)

(73) Assignee: General Electric Company, Schenectady, NY (US)

( * ) Notice: Subject to any disclaimer, the term of this patent is extended or adjusted under 35 U.S.C. 154(b) by 640 days.

(21) Appl. No.: 12/258,670

(22) Filed: Oct. 27, 2008

(65) Prior Publication Data

US 2010/0101543 A1    Apr. 29, 2010

(51) Int. Cl.
*F02C 3/34* (2006.01)

(52) U.S. Cl.
USPC ................................ 60/772; 60/39.52; 60/736

(58) Field of Classification Search
USPC .................. 60/39.52, 39.5, 736, 772
See application file for complete search history.

(56) References Cited

U.S. PATENT DOCUMENTS

| | | | | |
|---|---|---|---|---|
| 5,595,059 A | * | 1/1997 | Huber et al. | 60/780 |
| 5,845,481 A | * | 12/1998 | Briesch et al. | 60/776 |
| 6,082,092 A | * | 7/2000 | Vandervort | 60/773 |
| 6,250,080 B1 | * | 6/2001 | Shelor et al. | 60/618 |
| 6,260,348 B1 | * | 7/2001 | Sugishita et al. | 60/39.12 |
| 6,598,402 B2 | * | 7/2003 | Kataoka et al. | 60/775 |
| 7,074,033 B2 | * | 7/2006 | Neary | 431/5 |
| 7,124,589 B2 | * | 10/2006 | Neary | 60/784 |
| 2005/0076645 A1 | * | 4/2005 | Frutschi et al. | 60/772 |
| 2006/0272334 A1 | * | 12/2006 | Pranda et al. | 60/783 |
| 2008/0120960 A1 | * | 5/2008 | Agnew | 60/39.52 |

FOREIGN PATENT DOCUMENTS

| | | |
|---|---|---|
| CN | 1293735 A | 5/2001 |
| CN | 1314973 A | 9/2001 |
| CN | 1864032 A | 11/2006 |

OTHER PUBLICATIONS

Search Report from CN Application No. 200910209240.1 dated Mar. 26, 2013.

* cited by examiner

*Primary Examiner* — Phutthiwat Wongwian
*Assistant Examiner* — Michael B Mantyla
(74) *Attorney, Agent, or Firm* — Ernest G. Cusick; Frank A. Landgraff

(57) ABSTRACT

An embodiment of the present invention may take the form of a system that may use the heat removed from an exhaust stream during an exhaust gas recirculation process to heat the fuel consumed by a turbomachine.

16 Claims, 2 Drawing Sheets

SYSTEM AND METHOD FOR HEATING A FUEL USING AN EXHAUST GAS RECIRCULATION SYSTEM This application is related to commonly-assigned U.S. patent application Ser. No. 11/928,038, filed Oct. 30, 2007; U.S. patent application Ser. No. 11/953,524, filed Dec. 10, 2007; U.S. patent application Ser. No. 11/936,996, filed Nov. 7, 2007; and U.S. patent application Ser. No. 11/960,198, filed Dec. 19, 2007.

BACKGROUND OF THE INVENTION

The present invention relates to the exhaust gas emitted from a turbomachine, and more particularly to a system and method of utilizing a turbomachine as a prime mover of the exhaust gas recirculated within an EGR system.

There is a growing concern over the long-term effects of Nitrogen Oxides (hereinafter NOx) and Carbon Dioxide (hereinafter "$CO_2$") and Sulfur Oxides (SOx) emissions on the environment. The allowable levels of emissions that may be emitted by a turbomachine, such as a gas turbine, are heavily regulated. Operators of turbomachines desire methods of reducing the levels of NOx, $CO_2$ and SOx emitted.

Significant amounts of condensable vapors exist in the exhaust gas stream. These vapors usually contain a variety of constituents such as water, acids, aldehydes, hydrocarbons, sulfur oxides, and chlorine compounds. Left untreated, these constituents will accelerate corrosion and fouling of the internal components if allowed to enter the turbomachine.

Exhaust gas recirculation (EGR) generally involves recirculating a portion of the emitted exhaust stream through an inlet system of the turbomachine. The exhaust stream is then mixed with the incoming airstream prior to combustion. The EGR process facilitates the removal and sequestration of concentrated $CO_2$, and may also reduce the NOx and SOx emission levels. Then the recirculated exhaust mixes with the incoming airstream to create an inlet fluid.

The exhaust stream that is recirculated during the EGR process generally exits the turbomachine at a temperature range of Up to about 1500 degrees Fahrenheit. These temperatures may be too high to allow the exhaust stream to be recirculated into the inlet section of the turbomachine. The EGR process reduces the temperature of the exhaust stream to an allowable range for recirculation into the turbomachine. The heat removed from the exhaust stream may be considered low value heat.

The temperature of the fuel consumed by a turbomachine is generally required to be within a specific range. The fuel may include, but is not limited to, various type of fuel oil, a natural gas, or a synthetic gas. The combustion systems of some turbomachine required a 'heated' fuel such as, heated natural gas. Generally, the natural gas supply does not heat the natural gas to the required temperature of the turbomachine. Here, a fuel heater(s) is used to increase the temperature of the natural gas to meet the turbomachine requirements. The fuel gas heater(s) require an energy source to operate. This energy source is typically a parasitic load and reduces the overall efficiency of the turbomachine site. An operator of the turbomachine site will appreciate if a source of low value heat is used to heat the natural gas, and/or other fuel consumed by the turbomachine.

For the foregoing reasons, there is a need for a system that reduces the parasitic load associated with heating the fuel consumed by a turbomachine integrated with an EGR system. The system should use low value heat to increase the temperature of the fuel consumed by the turbomachine.

BRIEF DESCRIPTION OF THE INVENTION

In accordance with an embodiment of the present invention, a system for increasing a temperature of a fuel, the system comprising: a turbomachine comprising: an inlet system for channeling an inlet fluid towards a compressor section of the turbomachine, wherein the inlet fluid comprises an airstream and an exhaust stream; and a combustion system for combusting a fuel and the airstream; and an exhaust gas recirculation (EGR) system comprising at least one EGR skid and at least one heat exchanging device; wherein the at least one EGR system is configured to: receive the exhaust stream at a first temperature from an exhaust section of a turbomachine; wherein the exhaust stream comprises constituents at a first level; allows for the exhaust steam to enter the EGR skid, which reduces the constituents to a second level; allows for the exhaust stream to exit the EGR skid at a second temperature and enter the inlet system; and wherein the at least one heat exchanging device receives the fuel at a first temperature and discharges the fuel at a second temperature while a portion of the exhaust stream flows through a portion of the at least one heat exchanging device.

In accordance with an alternate embodiment of the present invention a method of increasing a temperature of a fuel, the method comprising: providing a turbomachine, wherein the turbomachine comprises: an inlet system for channeling an inlet fluid towards a compressor section of the turbomachine, wherein the inlet fluid comprises an airstream and an exhaust stream, a combustion system for combusting a fuel and the airstream; and providing an exhaust gas recirculation (EGR) system comprising at least one EGR skid and at least one heat exchanging device; receiving the exhaust stream at a first temperature from an exhaust section of a turbomachine; wherein the exhaust stream comprises constituents at a first level; reducing the constituents to a second level; allowing the exhaust stream to exit the EGR skid at a second temperature and allowing the exhaust stream to enter the inlet system; and wherein the at least one heat exchanging device receives the fuel at a first temperature; and discharges the fuel at a second temperature while a portion of the exhaust stream flows through a portion of the at least one heat exchanging device.

DETAILED DESCRIPTION OF THE INVENTION

The following detailed description of preferred embodiments refers to the accompanying drawings, which illustrate specific embodiments of the invention. Other embodiments having different structures and operations do not depart from the scope of the present invention.

Certain terminology is used herein for the convenience of the reader only and is not to be taken as a limitation on the scope of the invention. For example, words such as "upper," "lower," "left," "right," "front", "rear" "top", "bottom", "horizontal," "vertical," "upstream," "downstream," "fore", "aft", and the like; merely describe the configuration shown in the Figures. Indeed, the element or elements of an embodiment of the present invention may be oriented in any direction and the terminology, therefore, should be understood as encompassing such variations unless specified otherwise.

An embodiment of the present invention takes the form of a system that may use the heat removed from an exhaust stream during an EGR process to heat the fuel consumed by a turbomachine. The elements of the present invention may be fabricated of any material that can withstand the operating environment under which the EGR system may function and operate.

Generally, the exhaust gas recirculation system of an embodiment of the present invention comprises multiple elements. The configuration and sequence of the elements may be dictated by the composition of the exhaust stream. In general the steps comprising the exhaust gas re-circulation process are: cooling, scrubbing, de-misting, high efficiency particulate and droplet removal, and mixing. When the present invention is utilized, the diverted exhaust stream, blended with inlet air, can be introduced to the turbine inlet. There are multiple arrangements that may be used to accomplish the EGR.

The present invention may be applied to the variety of turbomachines that produce a gaseous fluid, such as, but not limiting of, a heavy-duty gas turbine; an aero-derivative gas turbine; or the like. An embodiment of the present invention may be applied to either a single turbomachine or a plurality of turbomachines. An embodiment of the present invention may be applied to a turbomachine operating in a simple cycle or a combined cycle configuration.

An embodiment of the present invention may include at least one EGR skid. The at least one EGR skid may utilize at least one scrubber; or at least one scrubber and at least one downstream heat exchanger; or at least one scrubber and at least one upstream heat exchanger; or at least one scrubber, at least one downstream heat exchanger; and at least one upstream heat exchanger; or various combinations thereof. Moreover, the at least one EGR skid may also include an injector that may introduce a reagent for reducing the level of harmful constituents within the exhaust stream; and a wet electrostatic precipitator for removing the constituents.

Figure 1:
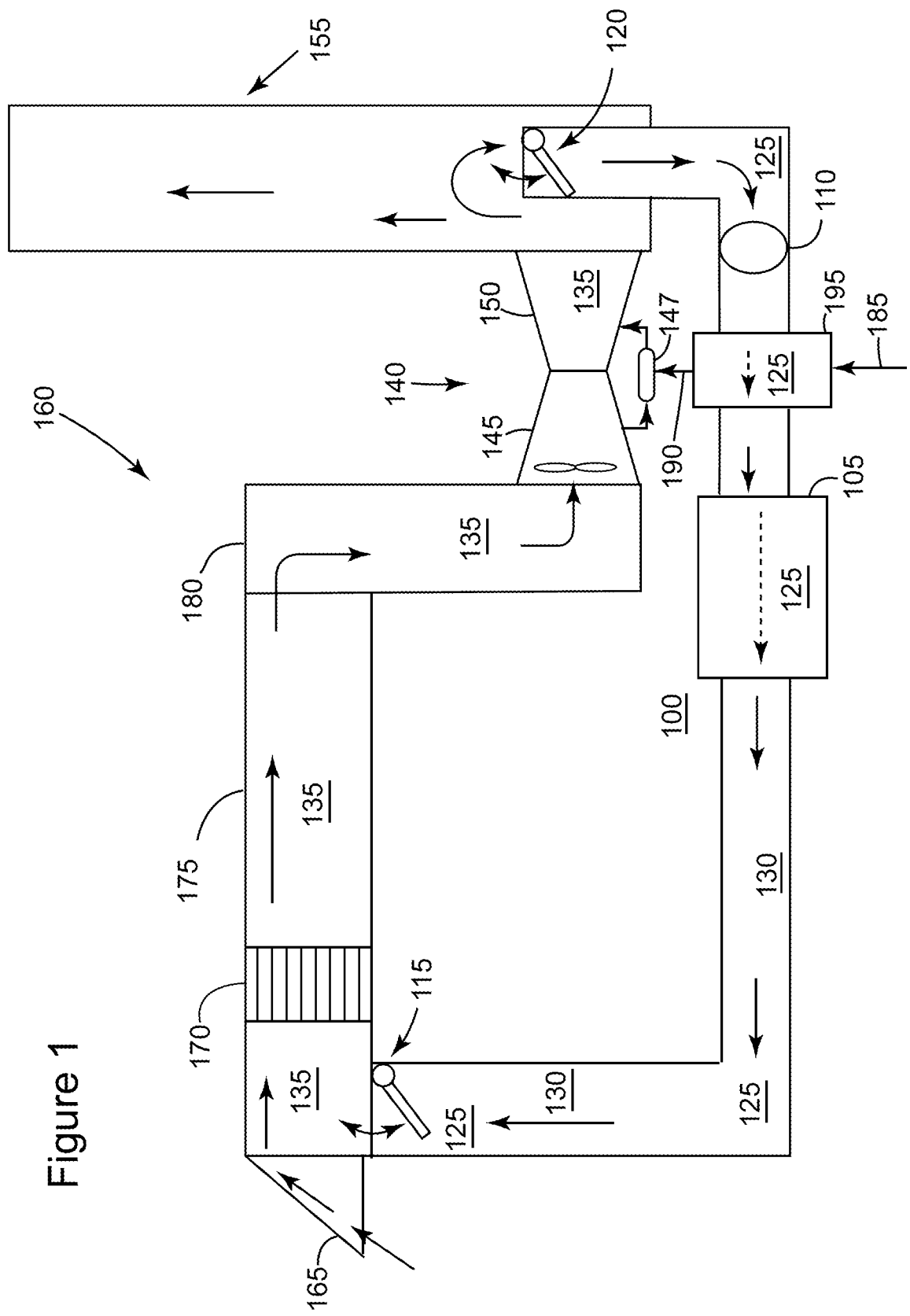
FIG. 1 is a schematic illustrating an example of a system for heating the fuel consumed by a turbomachine in accordance with a first embodiment of the present invention.

Referring now to the Figures, where the various numbers represent like elements throughout the several views, FIG. 1 is a schematic illustrating an example of a system for heating the fuel consumed by a turbomachine in accordance with a first embodiment of the present invention. FIG. 1 illustrates a turbomachine 140 and an EGR system 100.

The turbomachine 140 generally comprises a compressor section 145, a combustion section 147, and a turbine section 150. An inlet section 160 may be located upstream of the compressor section 145. The inlet section may comprise a weather hood 165, an inlet filter system 170, an inlet duct 175, and an inlet plenum 180. An exhaust stack 155 may be located downstream of the turbine section 150.

The EGR system 100, comprises: an EGR skid 105; an EGR flow circulation device 110; an EGR inlet damper 115; an EGR exhaust damper 120, which may be integrated with an turbine section 150 of the turbomachine 140; and a temperature regulation device 195.

The at least one EGR system 100 may be of a size and fabricated of a material capable of withstanding the physical properties of the exhaust stream 125, such as, but not limiting of, a flowrate comprising a range of from about 10,000 Lb/hr to about 50,000,000 Lb/hr and a temperature up to about 1500 Degrees Fahrenheit. The inlet section 160 and the turbine section 150 may bound the flow path 130 of the EGR system 100.

The EGR skid 105 generally includes the component(s) of the EGR system 100 that reduces the level of aforementioned constituents from the exhaust stream 125. These component (s) may include for example, but not limiting of, at least one heat exchanger, at least one scrubber, at least one demister, or similar components, (none of which are illustrated in the Figures). The EGR flow circulation device 110 may circulate the exhaust during the operation of the EGR system 100.

The temperature regulation device 195 generally serves to increase the temperature of a fuel supply 185 flowing to the combustion system 147. The temperature regulation device 195 may be in the form, but not limiting to, a heat exchanger. A portion of the temperature regulation device 195 may be positioned directly or indirectly within the flow path 130. The temperature regulation device 195 may comprise a plurality of ports (not illustrated) for receiving and discharging the exhaust stream 125 and the fuel. The temperature regulation device 195 may also comprises a heat exchanging section (not illustrated) for transferring the heat from the exhaust stream 125 to the fuel.

In this first embodiment of the present invention, the temperature regulation device 195 receives the fuel at first temperature via the fuel supply 185 and discharges the fuel via the fuel discharge 190 at a second temperature. Here, the second temperature is higher than the first temperature. Concurrently, the temperature regulation device 195 receives the exhaust stream 125 flowing in the flow path 130) at a first exhaust temperature and discharges the exhaust stream 125 to the flow path 130 at a second exhaust temperature. Here, the second temperature is lower than the first temperature. For example, but not limiting of, the temperature regulation device 195 may receive the fuel via the fuel supply 185 at a temperature range of from about 30 degrees Fahrenheit to about 100 degrees Fahrenheit; and may then discharge the fuel via the fuel discharge 190 at a temperature range of from about 200 degrees Fahrenheit to about 400 degrees Fahrenheit.

In use, during the operation of the EGR system 100, the EGR exhaust damper 120 may open to allow for the exhaust stream 125 from the turbine section 150 to enter the EGR system 100. The exhaust damper 120 may apportion the total exhaust flow between a non-recirculated exhaust and the exhaust stream 125. Then, the temperature regulation device 195 allows the exhaust stream 125 to flow, either directly or indirectly throughout, while the temperature of the fuel is increased, as described. Next, the EGR skid 105 may reduce the level of constituents within the exhaust stream 125. Next, the EGR inlet damper 115 may open to allow for the recirculated exhaust stream 125 to enter the inlet section 160 of the turbomachine 140. The exhaust stream 125 may then mix with the inlet air entering the inlet system 160 forming an inlet fluid 135. Throughout the figures the inlet air is represented by an arrow (s) located external to the weather hood 165. The inlet fluid 135 may then flow downstream to the compressor section 145 of the turbomachine 140. During the aforementioned process, the EGR flow circulation device 110 may move the exhaust stream 125 throughout the EGR system 100.

The turbomachine 140 comprises a compressor section 145 having a rotor (not illustrated). The operation of the turbomachine 140 generally includes the following. The inlet fluid 135 deriving from the inlet system 160 enters the compressor section 145, is compressed and then discharges to a combustion system 147, which may receive the fuel from the fuel discharge 190. The fuel is burned and provides high-energy combustion gases that drive the turbine section 150. In the turbine section 150, the energy of the hot gases is converted into work, some of which is used to drive the compressor section 145.

Figure 2:
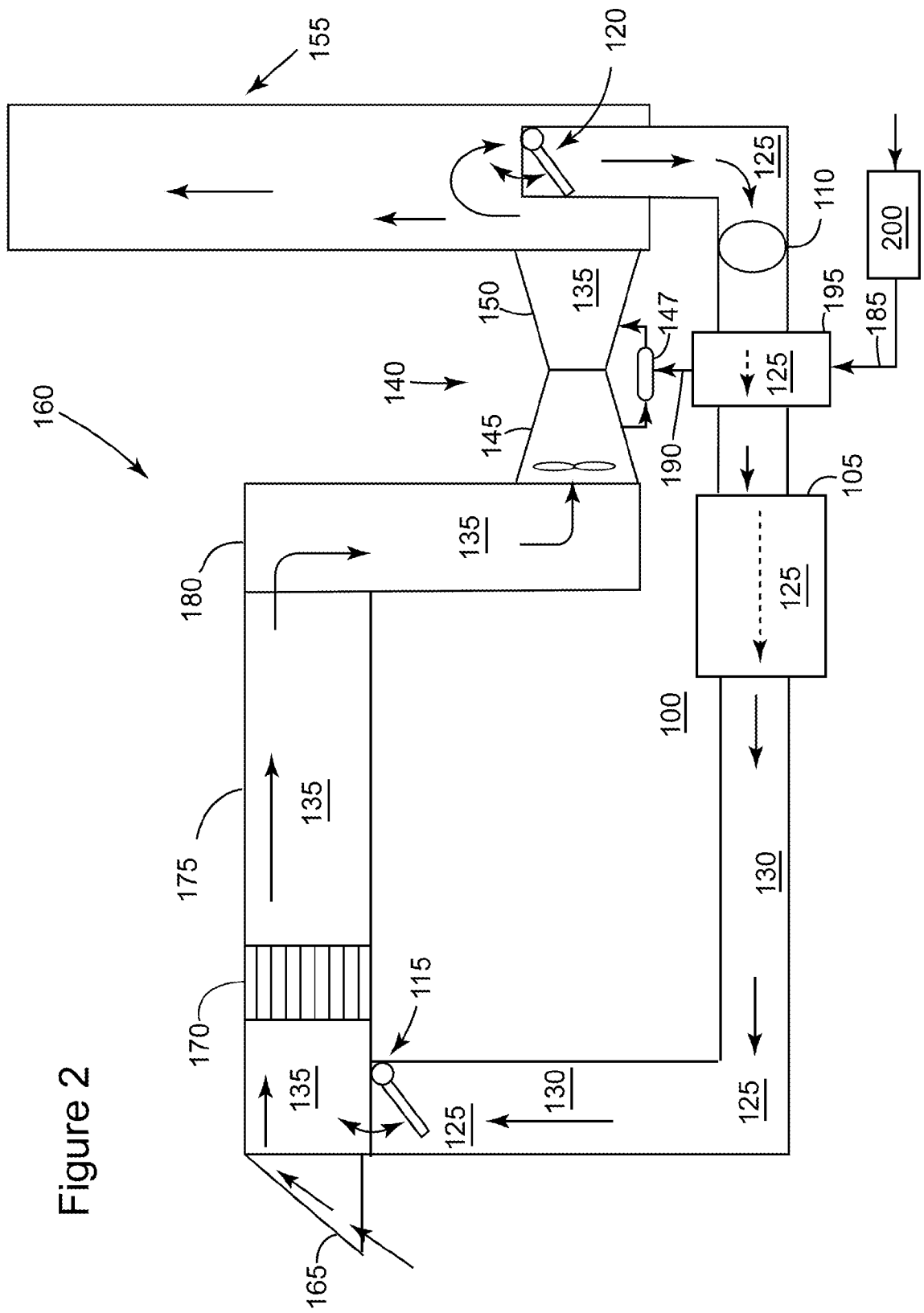
FIG. 2 is a schematic illustrating an example of a system for heating the fuel consumed by a turbomachine in accordance with a second embodiment of the present invention.

FIG. 2 is a schematic illustrating an example of a system for heating the fuel consumed by a turbomachine 140 in accordance with a second embodiment of the present invention. FIG. 2 illustrates a turbomachine 140 and an EGR system 100. FIG. 2 illustrate alternate embodiment of the present invention. The discussion of FIG. 2 focuses on difference between the first embodiment and the embodiment of FIG. 2.

The EGR system 100 of the second embodiment may be integrated with at least one fuel gas heater 200. This second embodiment of the present invention may be used when an EGR system 100 comprises a plurality of EGR skids 105 (only one is illustrated in FIG. 2). Here, an additional heating source may be required to increase the temperature of the fuel to the desired range. The present invention provides the flexibility of locating the at least one fuel gas heater 200, either upstream and/or downstream of the temperature regulation device 195.

As illustrated in FIG. 2, in this second embodiment of the present invention, the fuel gas heater 200 may raise the fuel to a first temperature. Then the at least one fuel gas heater 200 may discharge the fuel to the temperature regulation device 195 via the fuel supply 185. Here, the fuel may be raised to a second temperature. The temperature regulation device 195 may discharges the fuel via the fuel discharge 190 at a third temperature, which may be in the desired temperature range for the turbomachine. Concurrently, the temperature regulation device 195 receives the exhaust stream 125 flowing in the flow path 130 at a first exhaust temperature and discharges the exhaust stream 125 to the flow path 130 at a second exhaust temperature. Here, the second temperature is lower than the first temperature. For example, but not limiting of, the temperature regulation device 195 may receive the fuel via the fuel supply 185 at a temperature range of from about 70 degrees Fahrenheit to about 120 degrees Fahrenheit; and then discharge the fuel via the fuel discharge 190 at a temperature range of from about 200 degrees Fahrenheit to about 400 degrees Fahrenheit.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system comprising:
 a turbomachine comprising:
  an inlet system for channeling an inlet fluid towards a compressor section of the turbomachine, wherein the inlet fluid comprises and airstream and an exhaust stream;
  an exhaust section; and
  a combustion system for combusting a fuel and the airstream; and
 an exhaust gas recirculation (EGR) system that fluidly connects and exhaust stack, located downstream of the exhaust section, and the inlet system, wherein the EGR system comprises:
  at least one EGR skid;
  an EGR exhaust damper connected at an inlet portion of the EGR system and near the exhaust stack, such that the EGR exhaust damper comprises structure that divides the exhaust stream exiting the exhaust section into the portion that enters the inlet section and a portion of the exhaust stream that discharges through the exhaust stack;
  an EGR inlet damper connected near a discharge portion of the EGR system and located near a portion of the inlet system fluidly connected to a weather hood, such that modulation of the EGR inlet damper allows the exhaust stream to enter the inlet section and mix with inlet air flowing into the inlet system from the weather hood, wherein the mixture of the inlet air and exhaust stream flows through a filter system; and
  at least one heat exchanging device that is fluidly connected to the combustion system and positioned within the EGR system;
 wherein the at least one EGR system is configured to:
  receive the exhaust stream at a first temperature from an exhaust section of a turbomachine; wherein the exhaust stream comprises constituents at a first level;
  allows the exhaust stream to enter the EGR skid, which reduces the constituents to a second level;
  allows the exhaust stream to exit the EGR skid at a second temperature and enter the inlet system; and
  wherein the at least one heat exchanging device receives the fuel at a first temperature and discharges the fuel at a second higher temperature while a portion of the exhaust stream flows through a portion of the at least one heat exchanging device, wherein the exhaust stream enters the portion of the at least one heat exchanging device at a first temperature and exits at a second lower temperature.

2. The system of claim 1, wherein the first temperature of the fuel comprises a range of from about 30 degrees Fahrenheit to about 100 degrees Fahrenheit.

3. The system of claim 1, wherein the second temperature of the fuel comprises a range of from about 200 degrees Fahrenheit to about 400 degrees Fahrenheit.

4. The system of claim 1, wherein a temperature of the exhaust stream is up to about 1500 degrees Fahrenheit.

5. The system of claim 1, wherein the EGR system comprises at least one EGR exhaust damper that controls the amount of the exhaust stream flowing in the EGR system.

6. The system of claim 1, further comprising at least one fuel gas heater configured to increase a temperature of the fuel.

7. The system of claim 6, wherein the at least one fuel gas heater supplies fuel to the at least one heat exchanging device.

8. The system of claim 1, wherein the at least one heat exchanging device is located upstream of the EGR skid.

9. A method comprising:
 operating a turbomachine, wherein the turbomachine comprises:
  an inlet system for channeling an inlet fluid towards a compressor section of the turbomachine, wherein the inlet fluid comprises an airstream and an exhaust stream, a combustion system for combusting a fuel and the airstream;

operating an exhaust gas recirculation (EGR) system comprising at least one EGR skid and at least one heat exchanging device within the EGR system;

opening an EGR exhaust damper which connected at an inlet portion of the EGR system and near the exhaust stack, wherein the EGR exhaust damper comprises structure that divides the exhaust stream exiting the exhaust section into the portion that enters the inlet section and a portion of the exhaust stream that discharges through the exhaust stack;

opening and EGR inlet damper that is connected near a discharge portion of the EGR system and located near a portion of the inlet system fluidly connected to a weather hood, wherein opening the EGR inlet damper allows the exhaust stream to enter the inlet section and mix with inlet air flowing into the inlet system from the weather hood, wherein the mixture of the inlet air and exhaust stream flows through a filter system; and receiving the exhaust stream at a first temperature from an exhaust section of a turbomachine; wherein the exhaust stream comprises constituents at a first level;

reducing the constituents to a second level;

allowing the exhaust stream to exit the EGR skid at a second temperature and allowing the exhaust stream to enter the inlet system; and wherein the at least one heat exchanging device receives the fuel at a first temperature; and discharges the fuel at a second higher temperature while a portion of the exhaust stream flows through a portion of the at least one heat exchanging device at a first temperature and exits at a second lower temperature.

10. The method of claim 9, further comprising increasing the first temperature of the fuel to a range of from about 30 degrees Fahrenheit to about 100 degrees Fahrenheit.

11. The method of claim 9, further comprising increasing the second temperature of the fuel to a range of from about 200 degrees Fahrenheit to about 400 degrees Fahrenheit.

12. The method of claim 9, wherein a temperature of the exhaust stream is up to about 1500 degrees Fahrenheit.

13. The method of claim 9, wherein the EGR system comprises at least one EGR exhaust damper that controls the amount of the exhaust stream flowing in the EGR system.

14. The method of claim 9, further comprising providing at least one fuel gas heater configured to increase a temperature of the fuel.

15. The method of claim 14, wherein the at least one fuel gas heater supplies fuel to the at least one heat exchanging device.

16. A method comprising:

operating a turbomachine, wherein the turbomachine comprises:

an inlet system for channeling an inlet fluid towards a compressor section of the turbomachine, wherein the inlet fluid comprises an airstream and an exhaust stream, a combustion system for combusting a fuel and the airstream;

operating an exhaust gas recirculation (EGR) system comprising at least one EGR skid and at least one heat exchanging device;

opening an EGR exhaust damper which is connected at an inlet portion of the EGR system and near the exhaust stack, wherein the EGR exhaust damper comprises structure that divides the exhaust stream exiting the exhaust section into the portion that enters the inlet section and a portion of the exhaust stream that discharges through the exhaust stack;

opening an EGR inlet damper that is connected near a discharge portion of the EGR system and located near a portion of the inlet system fluidly connected to a weather hood, wherein opening the EGR inlet damper allows the exhaust stream to enter the inlet section and mix with inlet air flowing into the inlet system from the weather hood, wherein the mixture of the inlet air and exhaust stream flows through a filter system; and receiving the exhaust stream at a first temperature from an exhaust section of a turbomachine; wherein the exhaust stream comprises constituents at a first level;

reducing the constituents to a second level;

allowing the exhaust stream to exit the EGR skid at a second temperature and allowing the exhaust stream to enter the inlet system;

operating at least one fuel gas heater to increase a temperature of the fuel;

supplying the fuel that discharges from the at least one fuel gas heater to at least one heat exchanging device within the EGR system; and operating the at least one fuel gas heater to increase the temperature of the fuel; wherein a portion of the exhaust stream flows through a portion of the at least one heat exchanging device;

wherein the at least one heat exchanging device receives the fuel at a first temperature; and discharges the fuel at a second higher temperature while a portion of the exhaust stream flows through a portion of the at least one heat exchanging device at a first temperature and exits at a second lower temperature.

* * * * *

UNITED STATES PATENT AND TRADEMARK OFFICE
CERTIFICATE OF CORRECTION

| | |
|---|---|
| PATENT NO. | : 8,534,073 B2 |
| APPLICATION NO. | : 12/258670 |
| DATED | : September 17, 2013 |
| INVENTOR(S) | : Garcia-Crespo et al. |

Page 1 of 1

It is certified that error appears in the above-identified patent and that said Letters Patent is hereby corrected as shown below:

In the Specification

In Column 1, Line 43, delete "Up to" and insert -- up to --, therefor.

In Column 4, Line 28, delete "130)" and insert -- 130 --, therefor.

Signed and Sealed this
Twelfth Day of November, 2013

Teresa Stanek Rea
*Deputy Director of the United States Patent and Trademark Office*